(12) United States Patent
Mosescu

(10) Patent No.: US 7,647,291 B2
(45) Date of Patent: Jan. 12, 2010

(54) B-TREE COMPRESSION USING NORMALIZED INDEX KEYS

(75) Inventor: Leonard Ciprian Mosescu, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 215 days.

(21) Appl. No.: 10/748,569

(22) Filed: Dec. 30, 2003

(65) Prior Publication Data

US 2005/0165850 A1   Jul. 28, 2005

(51) Int. Cl.
*G06F 17/30* (2006.01)

(52) U.S. Cl. .................................... 707/1; 707/2; 707/3

(58) Field of Classification Search ...................... 707/2, 707/1, 100
See application file for complete search history.

(56) References Cited

U.S. PATENT DOCUMENTS 5,813,000 A    9/1998  Furlani ........................ 707/3
6,055,526 A *  4/2000  Ambroziak ..................... 707/2
2003/0204513 A1* 10/2003  Bumbulis .................... 707/100

OTHER PUBLICATIONS

Bayer, R. et al., "Prefix B-Trees", *ACM Transactions on Database Systems*, Mar. 1977, 2(1), 11-26.
Bumbulis, P. et al., "A Compact B-tree", *ACM SIGMOD*, Jun. 2002, 533-541.
Lomet, D., "The Evolution of Effective B-tree: Page Organization and Techniques: A Personal Account", *SIGMOD Record*, Sep. 2001, 30(3), 64-67.
Lomet, D.B., "Multi-Table Search for B-Tree Files", *ACM*, 1979, 35-42.

* cited by examiner

*Primary Examiner*—Don Wong
*Assistant Examiner*—Sheree N Brown
(74) *Attorney, Agent, or Firm*—Woodcock Washburn LLP

(57) ABSTRACT

A b-tree may contain multiple keys stored in a normalized form. This normalized form allows keys to be quickly compared and may be used in compressing the underlying b-tree. Each normalized key is compressed relative to the previous key by replacing the common prefix bytes with a common prefix length byte containing the number of bytes in common between the key and the previous key. The compressed keys are stored sequentially in memory with no gaps in between.

10 Claims, 6 Drawing Sheets

B-TREE COMPRESSION USING NORMALIZED INDEX KEYS

FIELD OF THE INVENTION

This invention relates in general to the field of b-tree compression. More particularly, this invention relates to the normalization of b-tree keys that are made up of column values of various types to allow for quick byte by byte comparison of keys and make the keys more suitable for prefix compression.

BACKGROUND OF THE INVENTION

A b-tree is a type of data structure used to quickly locate files (called keys) in a database. B-trees are usually used in parallel with databases because they generally only hold key values. Each node of a b-tree may have a variable number of keys and children. The keys are stored in increasing order. Each key has an associated child that is the root of a subtree containing all nodes with keys less than or equal to the key but greater than the preceding key. A node also has an additional rightmost child that is the root for a subtree containing all keys greater than any keys in the node. This property allows users to quickly locate a particular key. Once the desired key is located in the b-tree, the key can then be used to quickly retrieve the rest of the record that the user may desire to locate from a database. It is also common to have a number of b-trees used to index the same set of records. For example, a user of a contacts database may have a b-tree containing keys corresponding to first names, and another corresponding to last names, allowing the fast retrieval of records using first names or last names.

Given the fact that generating a b-tree from the set of records is not practical for a large number of records (e.g., because of time and memory space considerations), they are persisted together with the records in the database persistent storage, so their size contributes to the end database size. The size required to store a database is important even with the progress made in terms of storage media capabilities. The database may have to be used on a device with less capabilities (e.g., PDAs, cell phones, embedded devices) or it may have to be backed up frequently. Also, a larger persisted database size will likely lead to a poor overall performance, as more I/O has to be done.

The recent development in the smart devices market created a demand for small, reliable and fast database engines, as a common usage for those devices is to support a 'mobile' data storage. This storage may include data such as contacts and email or fairly large databases of business data.

Database size is more critical with these devices, as they usually provide limited storage capabilities. At the same time, storing database files on relatively slow storage like flash memory puts more pressure on minimizing the number of I/O, and this makes a good storage approach critical for a database engine in this market.

In view of the foregoing, there is a need for fast, efficient, and reliable systems and methods for minimizing the size of a b-tree.

SUMMARY OF THE INVENTION

The present invention is directed to systems and methods for compression of a b-tree using normalized index keys. A b-tree may contain multiple keys, and each key may contain several columns of different types. A key may be viewed as a concatenation of the binary representation of the individual column values. However, each type may have its own particular binary representation, making it difficult to compare values of different types. A normalized key may be compared with another normalized key without any instantiation of types or use of any type specific functions.

A b-tree made up of normalized keys may be well suited for a prefix based compression. Where previous solutions may have first determined the largest common prefix on a particular memory page, resulting in suboptimal compression ratios, aspects of the present invention may compress a particular normalized key based on its common prefix with the previous key. A normalized key may be replaced with a byte that indicates how many bytes it shares in common with the previous key, followed by the bytes that are different. Keys are desirably stored uncompressed on a memory page until it may be determined that a subsequent key addition may result in a costly page split, thus avoiding the split. By compressing only before a split, the costs associated with compressing are more than offset by the gains of avoiding a page split.

Additional features and advantages of the invention will be made apparent from the following detailed description of illustrative embodiments that proceeds with reference to the accompanying drawings.

BRIEF DESCRIPTION OF THE DRAWINGS

The foregoing summary, as well as the following detailed description of preferred embodiments, is better understood when read in conjunction with the appended drawings. For the purpose of illustrating the invention, there is shown in the drawings exemplary constructions of the invention; however, the invention is not limited to the specific methods and instrumentalities disclosed. In the drawings.

DETAILED DESCRIPTION OF PREFERRED EMBODIMENTS

Overview

The present invention is directed to b-tree compression for use in systems such as mobile devices where database size is critical. The exemplary systems and methods described herein overcome conventional problems, such as compression speed and suboptimal compression ratios found in current techniques and systems.

B-trees may consist of normalized index keys, each key consisting of column values. The normalized index keys have the property that they can be quickly and easily compared without type instantiation or type specific functions. Normalized index keys are stored on memory pages in sorted order with no gaps in between them. A selected normalized key may be compressed by comparing it with the preceding normalized key. The selected normalized key is compressed by replacing it with common byte length, representing the length in bytes of the common prefix between the selected key and the preceding key, followed by the bytes unique to the selected key. The first key in a memory page may always be uncompressed. Compressed keys are uncompressed by uncompressing previous keys until an uncompressed key is reached.

Exemplary Embodiments

Figure 1:
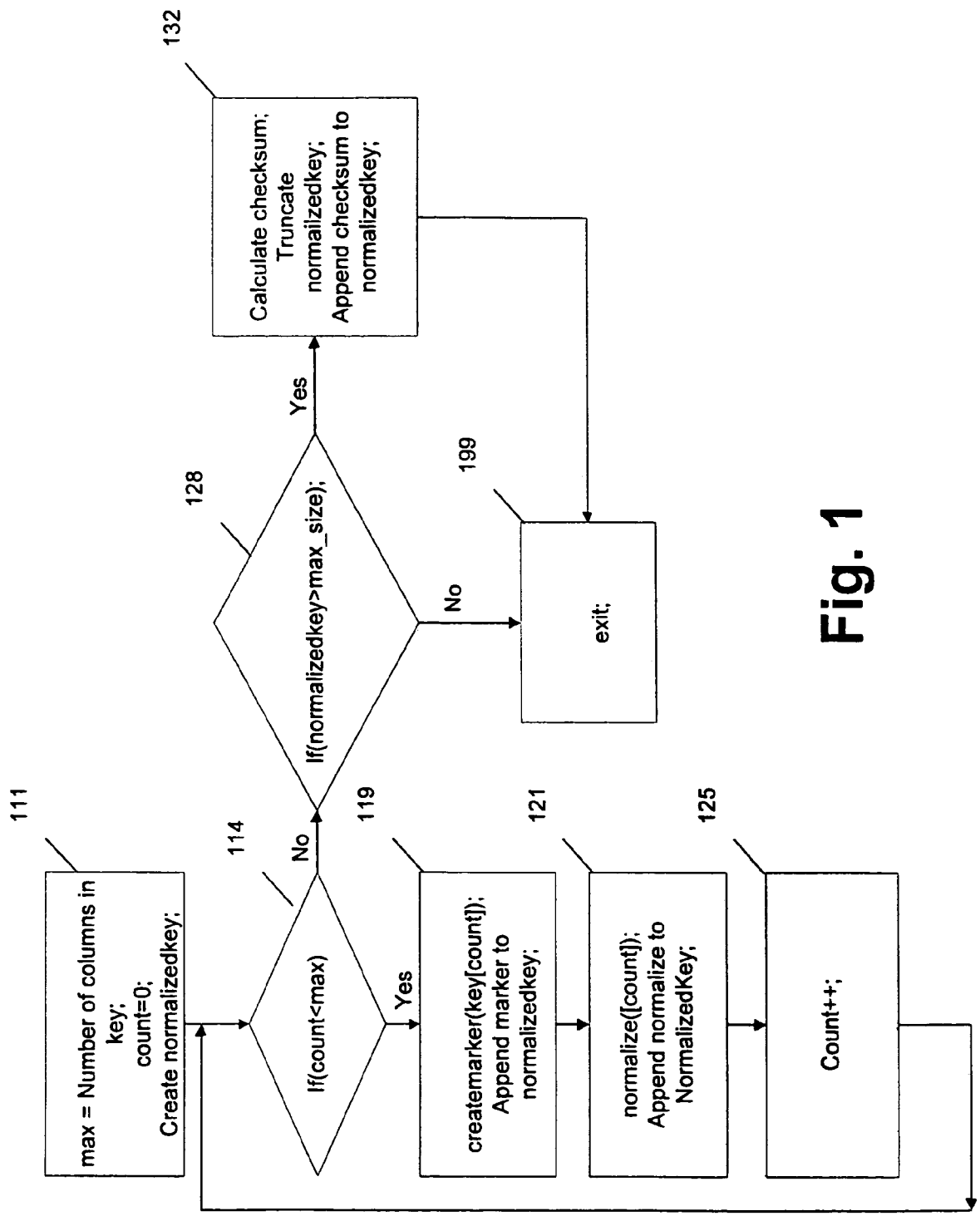
FIG. 1 is a flow diagram showing an exemplary method for index key normalization in accordance with the present invention.

FIG. 1 is a flow diagram illustrating an exemplary embodiment of normalizing an index key in a b-tree. A key comprises a logical sequence of column values, each column having a type. A normalized key can be constructed by concatenating, from left to right, the normalized form of individual column values. Each type has an associated transformation function that can be used to create the normalized value. The normalized keys can be seen as binary strings that can be compared byte by byte, from left to right, with no type instantiation or type specific functions required.

At step 111, a key is selected for normalization. The key can consist of multiple columns of multiple types. A variable (e.g., "max") is set to the total number of columns in the key. A counting variable (e.g., "count") is set to zero, and is incremented by one each time one of the columns in the key is normalized. It may be appreciated that by comparing the values of max and count in can be determined if there are any remaining columns of the key to normalize. A variable (e.g., "normalizedkey") is also created to store the value of the normalized key as it is generated.

At step 114, the values of max and count are compared. If count is greater than or equal to max, the exemplary process continues at step 128 (described further below). If count is less than max, then the exemplary process continues at step 119.

At step 119, the embodiment desirably calls a function (e.g., "create marker") to determine the value of the marker for the normalized column value at position count in the key. Create marker desirably takes the value of the key column at position count and returns a marker. In the exemplary embodiment, the marker can be one byte, or eight bits, in size and acts as a header for the normalized column value. The selection of one byte for the size of the marker is for illustrative purposes only and not meant to limit the invention to a marker of one byte. The marker can be a bit mask made from a combination of bit flags that allow the determination of the correct key column sort order and to quickly provide information about the normalized column value itself, such as null or not null. The format of the marker byte header is desirable for determining the correct sort order of the normalized key, as well as keeping the normalized key compact. It may be appreciated that the following uses and construction for the marker byte are presented for illustrative purposes only and are not meant to limit the invention to the listed uses and constructions.

For example, bits 0 through 3 of the marker byte can be set to the hexadecimal value 0x05. This value is the same for all marker bytes. Bit 4 is set to 0 if null values are sorted high and to 1 if null values are sorted low. Sorting null values high or low is a property of the underlying b-tree. Bit 5 may be relevant only where a column value is of type bit. If the type of the column is not bit, bit 5 is set to 0. If the type of the column is bit, then bit 5 is set equal to the column value. Bit 6 is set to 1 if the column value is null or to 0 if the column value is not null. However if bit 4 is set to 1, indicating nulls sorted low, the resulting bit 6 value is inverted. Bit 7 is set to 0 if the underlying b-tree is sorted in ascending sort order, and is set to 1 if the underlying b-tree is sorted in descending sort order. The resulting marker byte is now appended to normalizedkey.

At step 121, a function (e.g., "normalize function") is called to normalize the column value at position count in the key. Normalize function takes the value of the key column at position count and returns a normalized value. Each type can have an associated transformative function to create the normalized value. Normalize function selects the appropriate function based on the type of the column value passed.

Table 1 describes an exemplary normalization function for certain individual types. It may be appreciated that the normalization functions for the types are presented for illustrative purposes only and are not meant to limit the invention to the listed types.

In Table 1, the following notation is used: o[N] represents the Nth byte of the normalized column value, i[N] represents the Nth byte of the unnormalized column value, and the column values are treated as arrays of unsigned bytes. This description assumes a least significant byte ordering commonly used by microprocessors, such as Intel® processors, for example.

TABLE 1

| Type | Size (Bytes) | Normalized form |
|---|---|---|
| TINYINT | 1 | store the byte unchanged<br>o[0] = i[0] |
| SMALLINT | 3 | switch the bytes and flip the sign bit<br>o[0] = i[1] ^ 0x80 // flip the sign bit<br>o[1] = i[0] |
| UI3 | 3 | switch hi/lo bytes<br>o[0] = i[1]<br>o[1] = i[0] |
| UI4 | 4 | switch hi/lo bytes<br>o[n] = i[3 − n] |
| UI8 | 8 | switch hi/lo bytes<br>o[n] = i[7 − n] |
| INTEGER | 4 | switch hi/lo bytes, flip sign bit<br>i[3] ^= 0x80<br>o[n] = i[3 − n] |
| BIGINT | 8 | switch hi/lo bytes, flip sign bit<br>i[7] ^= 0x80<br>o[n] = i[7 − n] |
| GUID | 16 | rearrange the order of the bytes to match SQL server o[0 . . . 15] = i[10, 11, 13, 13, 14, 15, 8, 9, 6, 7, 4, 5, 0, 1, 3, 3] |
| BIT | 1 | This value is encoded in the marker byte. (The bit 5 in the marker byte encodes the value) |
| REAL | 4 | If sign bit is set, negate all the bytes, else set sign bit to 1<br>then store the bytes in reverse order<br>if(i[3] & 0x80) negate(i[0 . . . 3]) else i[3] |= 0x80 o[n] = i[3 − n] |
| FLOAT | 8 | if sign bit is set, negate all the bytes, else set sign bit to 1 then store the bytes in reverse order<br>if(i[7] & 0x80) negate(i[0 . . . 7]) else i[7] |= 0x80 o[n] = i[7 − n] |
| NVCHAR and NCHAR | Variable | The Microsoft ® function LCMapString( ) may be used along with any database sorting flags present in the underlying database |
| VARBINARY and BINARY | Variable | The variable may be grouped into eight byte segments, with the final segment containing any remainder bytes. Each segment, except the last, may have the value 0x09 appended to the end of the segment. Instead the last segment may have the number of bytes in the last segment appended to it with zeros added as necessary to fill the entire eight bytes. |

The normalized column value is now appended to normalizedkey.

At step 125, the value of count is increased by one. It is appreciated that increasing the value of count has the effect of moving the embodiment to the next column of the key. Processing continues at step 114 where the next column in the key may be normalized.

At step 128, the exemplary embodiment can check the size of normalizedkey to ensure it is less than a predetermined maximum size (e.g. "max_size"). It may be appreciated that ensuring that the normalizedkey is less than max_size keeps the resulting b-tree smaller and simplifies the compression of the b-tree. If normalizedkey is less than or equal to max_size, then processing continues at step 199. If normalizedkey is greater than max_size, then processing continues at step 133.

At step 132, a four byte checksum of normalizedkey is calculated. The selection of four bytes for the size of the checksum is for illustrative purposes only and not meant to limit the invention to a checksum of four bytes. It may be appreciated that any method, technique, or system known in the art for computing a checksum may be used. Normalizedkey can now be truncated by removing the bytes in excess of max_size from the end. The last four bytes of the truncated normalizedkey are replaced by the computed checksum. The embodiment can now go to step 199, where the routine exits.

Figure 2:
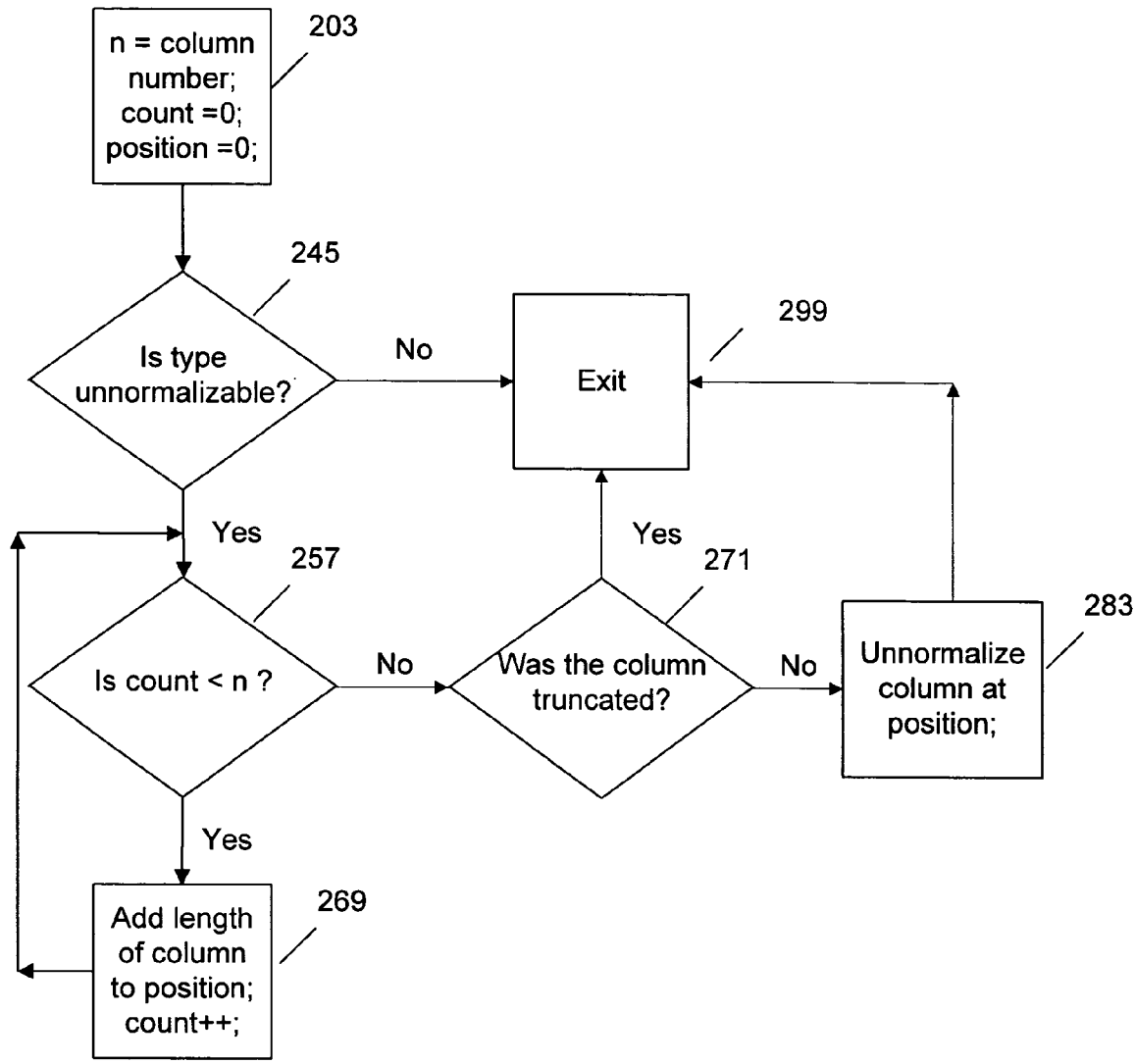
FIG. 2 is a flow diagram showing an exemplary method for normalized index key column unnormalization in accordance with the present invention.

FIG. 2 is a flow diagram illustrating an exemplary embodiment of unnormalizing a column value of a normalized index key in a b-tree. A user wishes to retrieve the unnormalized column value for a particular column in a normalized index key. The type of the column and of the preceeding columns is determined by reference to a file containing the types of all the columns in the database. It is first determined if the column is of the type that may be unnormalized. If the type can be unnormalized then the index key is stepped through column by column until the desired column is reached. The column is then unnormalized by reversing the normalization function as shown in table 1.

At step 203 a column at position n in a normalized key has been selected to unnormalize. The type for each of the columns in the key is determined by reference to a file containing the type associated with each column in the index key. It may be appreciated that any method, technique, or system known in the art for storing the types may be used. A counting variable (e.g., "count") may be initialized and set to zero. Count holds the number of the current column. A variable (e.g., "position") may also be initialized and set to zero. Position holds the current byte position in the normalized index key.

At step 245 it is determined if the column at position n can be unnormalized. If the type of column at position n is Nchar or Nvarchar then the column cannot be unnormalized. This is due to the use of the LCMapString( ) to normalize the column value function, as shown in Table 1. If the column can be normalized the embodiment desirably continues at step 257 to begin stepping through the columns of the index key, else the embodiment exits at step 299.

At step 257 it is determined if the desired column in the key has been reached. In order to find the desired column in the key, each previous column in the key must be stepped through, by determining the length of the column and moving forward a corresponding number of bytes. If count is less than n, indicating that there are more columns to step through, the embodiment desirably moves to step 269 where the current column can be stepped through. If the count is greater than or equal to count, then the desired column may have been reached and the embodiment may proceed to step 271.

At step 269 the length of the column at position count can be determined. Each column in the normalized index key comprises a marker byte followed by a normalized column value. The marker byte may be 1 byte in length, but each column length may vary depending on the type. For fixed length types this size is fixed for each type and is listed in the size column of Table 1. A column length can be determined by adding the size of the marker byte to the number of bytes in the type.

For types Nchar and Nvarchar, starting at position in the normalized index key, each byte following the marker byte is examined until a byte of hexadecimal value 0x00 is reached signifying the end of the column. For types Binary and Varbinary, starting at position in the normalized index key, each ninth byte following the marker byte is examined until a byte not equal to the hexadecimal value 0x09 is reached signifying the end of the column.

The length of the column in bytes is added to position, and the value of count is incremented by one. The embodiment desirably returns to step 257, where the next column length may be determined.

At step 271 the embodiment may determine if the column was truncated. As explained in FIG. 1, an index key larger than max_size is truncated by removing excess bytes from the index key and replacing the last four bytes with a checksum. During this truncation part of a column value may be lost or overwritten by the checksum, resulting in the inability to unnormalized the column value.

For fixed size types it is determined if the size of the column plus position is within four bytes of max_size. It may be appreciated that position holds the length of the normalized index key up to the current column. If position plus the size of the current column are less than four bytes from max_size then part of the column value may have been lost during the truncation. If not, then there has been no truncation of this column value.

For variable length types Binary and Varbinary, starting at position in the normalized index key, each ninth byte following the marker byte is examined until a byte not equal to the hexadecimal value 0x09 is reached signifying the end of the column, or the number of bytes examined plus position is within four bytes of max_size. If a byte not equal to the hexadecimal value 0x09 is not reached before the number of bytes examined plus position is within four bytes of max_size, then part of the column value may have been lost during the truncation. If not, then there has been no truncation of this column value.

If the column value was truncated then the column value may not be unnormalized, and the embodiment may exit at step 299. If the column value was not truncated than the column value may be unnormalized at step 283.

At step 283 the column value may be unnormalized. The column value may be unnormalized by applying the reverse of the normalization function originally used to normalize the column value of this type. The normalization functions are illustrated in Table 1. After normalizing the column value, the embodiment may exit at step 299.

At step 299 the embodiment may exit.

Figure 3:
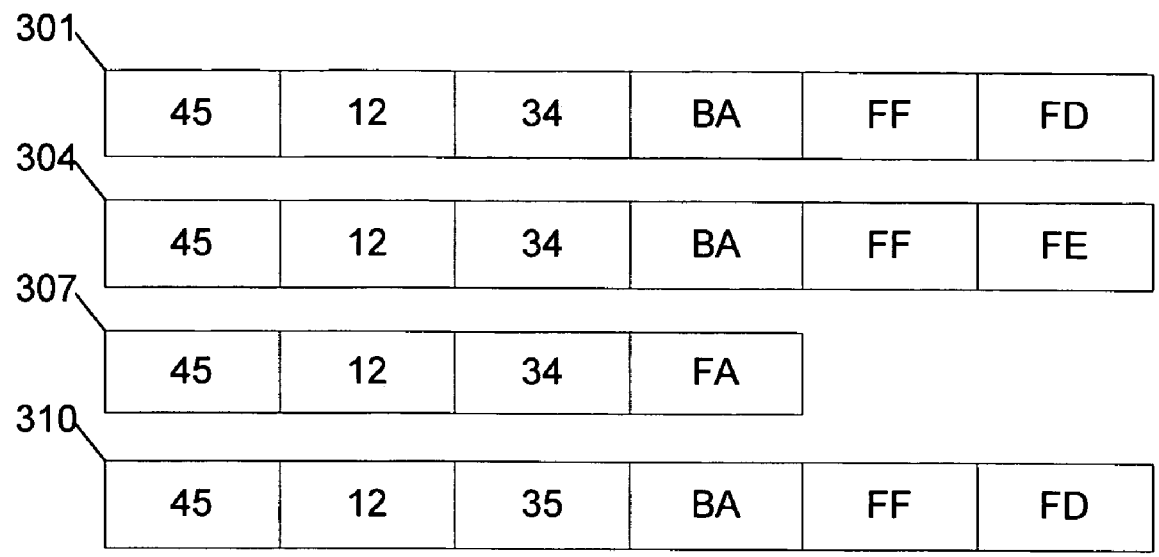
FIG. 3 is an example of normalized index keys in accordance with the present invention.
Figure 3:
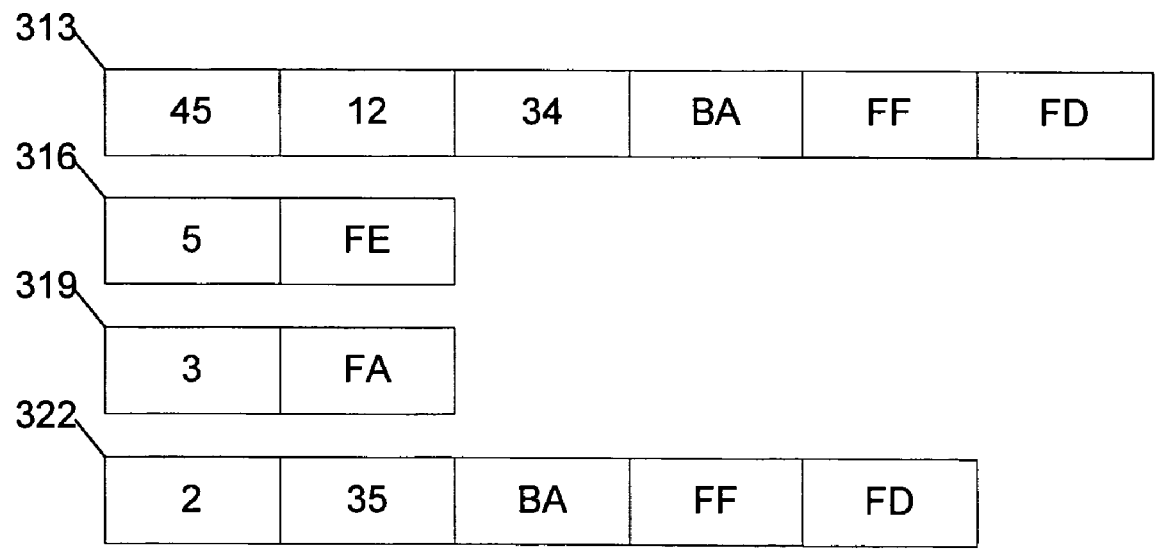

FIG. 3 is an example using a method for b-tree key compression in accordance with the present invention. In this example, keys are desirably stored in sorted order. It may be appreciated that this may result in an adjacent key being substantially similar to a preceding key. Often the keys will differ only by a small prefix. The exemplary embodiment can take advantage of this by, instead of storing each key, compressing the b-tree by storing only the difference between the key and the previous key. A desired key can then be uncompressed by following the chain of adjacent compressed keys until an uncompressed key is reached.

In this example, assume keys 301, 304, 307, 310 are exemplary keys that have been normalized in accordance with the present embodiment. Similarly, assume keys 313, 316, 319, 322 are compressed keys that have been compressed in accordance with the present invention. Key 313 corresponds to key 301, key 316 corresponds to key 304, key 319 corresponds to key 307, and key 322 corresponds to key 310.

The compressed key can be stored as a common prefix length, essentially the number of bytes that are the same between the key and the previous key, followed by the bytes that differ from the previous key. The common prefix length indicates how many bytes there are in common with the previous key. For example, a common prefix length value of two indicates that the key shares the first two bytes with the previous key.

In the present example, assume key 301 is the first key, and therefore is not compressed. It may be appreciated that the first key on a memory page is always left uncompressed, ensuring that any given key can be uncompressed without having to swap memory pages.

Assume key 304 has the first five bytes in common with key 301. The first byte of the compressed key 316 is five, indicating that the first five bytes of key 304 is the same as the previous key 301. The difference between key 304 and 301 is a byte with the hexadecimal value FE. The difference between key 301 and 304 can then be added to the end of the common prefix length of key 316.

Assume key 307 has the first three bytes in common with key 304. The first byte of the compressed key 319 is three, indicating that the first three bytes are the same as the previous key. The difference between key 307 and 304 is a byte with the hexadecimal value FA. The difference between the key 304 and 307 can then be added to the end of the common prefix length in key 319.

Assume key 310 has the first two bytes in common with key 307. The first byte of the compressed key 322 is two, indicating that the first two bytes are the same as the previous key. The difference between key 310 and 307 is four bytes with the hexadecimal value 35BAFFFD. The difference between the key 307 and 310 can then be added to the end of the common prefix length of key 322.

Compressing the keys relative to the previous key requires that in order to determine the value of any particular key, all the previous compressed keys have to be traversed until an uncompressed key is reached. For example, it is desirable to determine the uncompressed value of key 322. The common prefix length of two indicates that key 322 has the first two bytes in common with the previous key. Key 319 would then be examined to determine the value of the two common bytes.

Examination of key 319 can reveal that it is also compressed. As shown in the example, key 319 has a common prefix value of three indicating that key 319 has the first three bytes in common with the preceding key. Key 316 can now be examined.

Examination of key 316 can reveal that it is also compressed. Key 316 has a common prefix value of five indicating that key 316 has the first five bytes in common with the preceding key. Key 313 can now be examined.

Examination of key 313 reveals that it is uncompressed. The value of key 322 can now be determined. Following the chain of common prefix lengths indicates that key 322 has the first two bytes in common with uncompressed key 313. Therefore, key 322 can be uncompressed by appending the last four bytes of key 322 to the first two bytes of key 313.

It may be appreciated from the previous example, when a large number of keys is present, uncompressing a key can take an unacceptable amount of time because each previous key has to be examined to reconstruct the uncompressed key value. One solution to this problem is to keep every Nth key uncompressed. This minimizes the number of previous keys that need to be examined to uncompress a given key to N-1. The optimum value of N is different for different types of databases, keeping in mind that as N decreases, the effective compression of the b-tree decreases because more keys remain uncompressed.

Figure 4:
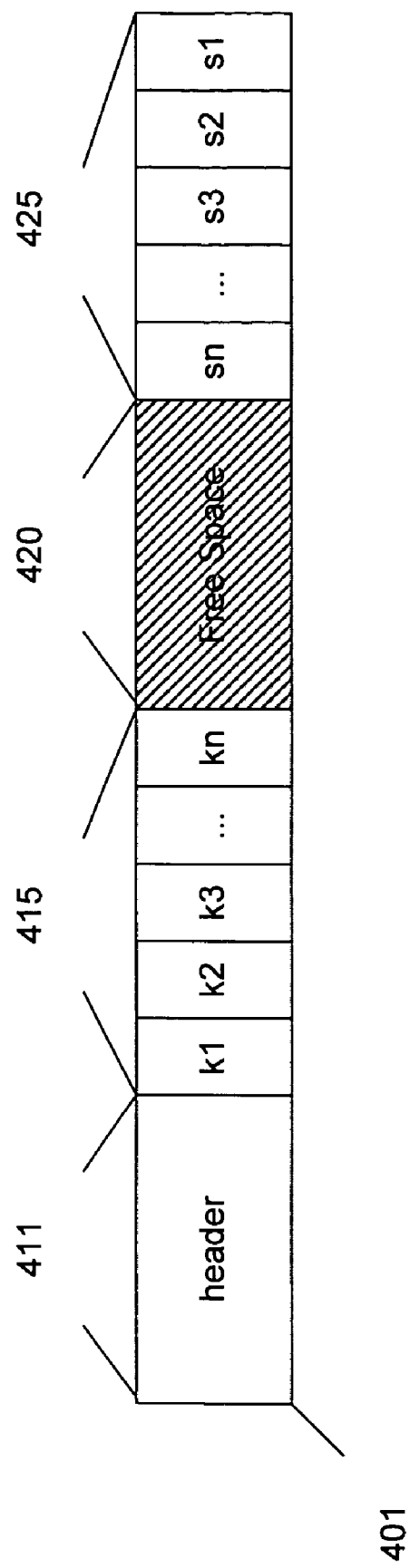
FIG. 4 is a block diagram of a memory page used to store index keys in accordance with the present invention.

FIG. 4 is a block diagram showing how keys are stored within a page of memory. In the present example, each page of memory can contain a page header, a number of keys, an amount of free memory space, and a slot corresponding to each key. In FIG. 4 reference numeral 401 refers to a sample page of memory used to store a compressed b-tree in accordance with the present invention. Any system, technique, or method known in the art for data storage can be used.

A page header 411 can contain certain memory page wide information such as the number of keys on the page, and database specification. It may be appreciated that the header can be a fixed size and consist of a very small percentage of the database size.

Stored keys 415 are stored immediately following the header. The keys are stored in sorted order with no gaps between keys. This can force the shifting of all subsequent keys if a key is deleted or inserted. It may be appreciated that by storing keys in order with no gaps, only the memory offset of any particular key is desirably stored, and not the length of the key because it can be determined by comparing the memory offset of the key and the subsequent key.

A free memory space 420, for the addition of new keys and corresponding slots, is also provided. There may be some amount of unused memory space on the page. The stored keys and the slots array 425 can grow towards each other, effectively shrinking the size of the free memory as they grow.

Regarding the slots array 425, there is a slot corresponding to each key on the memory page. Each slot is fixed in size and can contain the memory offset of the corresponding key, as well as a bit flag indicating if the key is compressed or not. The slots array 425 can start at the end of the memory page and grow backwards towards the stored keys. This can result in the maximum usage of the memory page without any artificial limitation on the number of keys that can be stored on a page.

Figure 5:
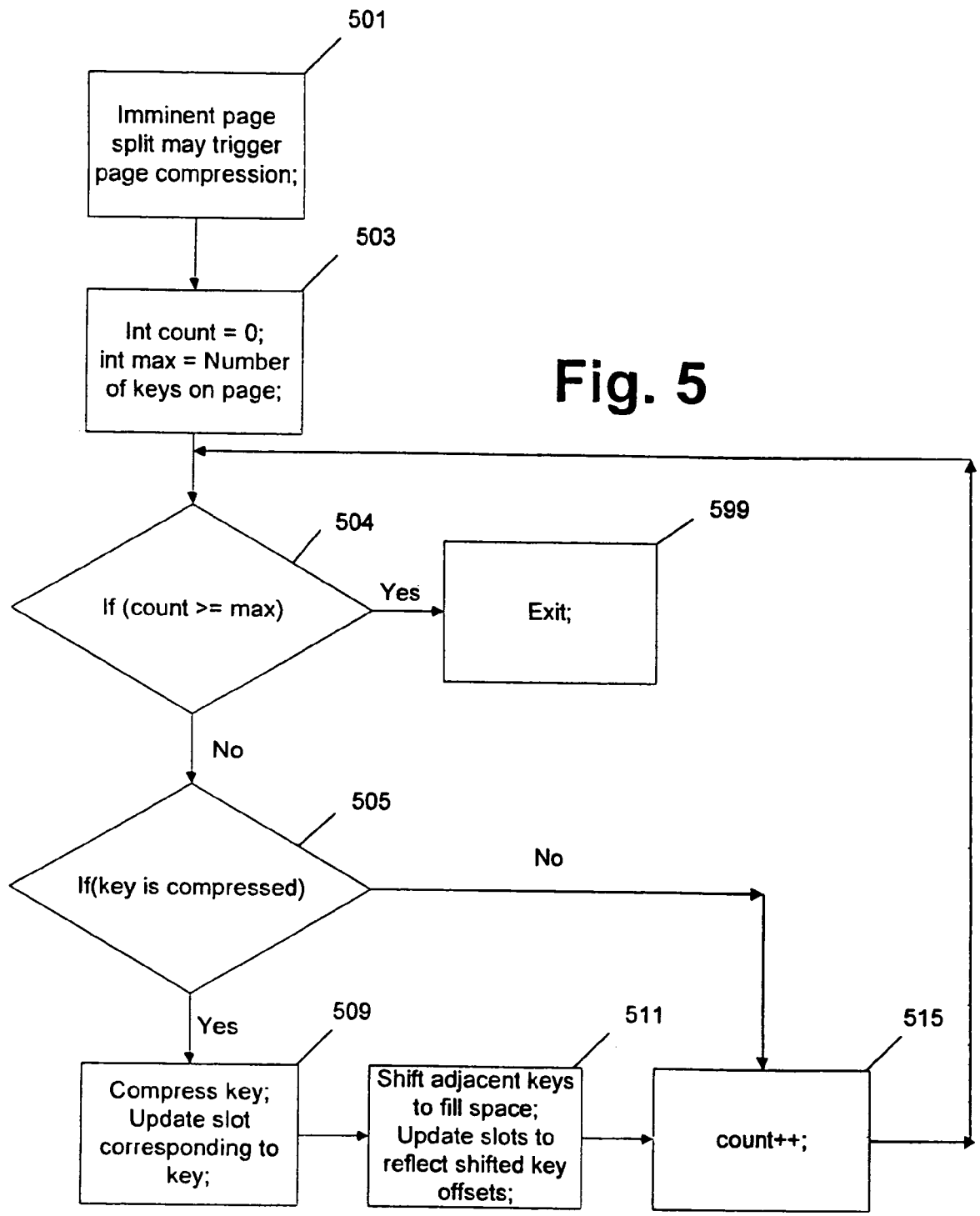
FIG. 5 is a flow diagram of an exemplary method for compressing normalized keys on a memory page in accordance with the present invention.

FIG. 5 illustrates an exemplary method for compressing normalized keys on a memory page. The memory page can contain both compressed and uncompressed keys. Each slot is desirably examined to determine if the key corresponding to that slot is compressed. If a slot indicates that the key is uncompressed, then the key corresponding to that offset can then be compressed. Subsequent keys are then shifted over to fill the space freed by compressing the key. The slots can also be updated to reflect the new memory offsets for the shifted keys.

At step 501, a memory page compressing event has been triggered, such as a page split. It may be desirable for the b-tree compression to be transparent to the end user and to perform the compression of the b-tree at some time when the operation will be the least intrusive. To this end, the present embodiment desirably compresses keys in a given memory page right before a slow operation such as a page split. A page split is a costly operation that occurs when a page of memory has been filled with keys. The memory page is split into two separate memory pages. It may be appreciated that by compressing before the page split, any cost associated with the compression desirably will be offset by the savings incurred by not splitting the memory page. The memory page can consist of compressed and uncompressed keys, because it is desirable to insert uncompressed keys and only compress keys when approaching a page split.

At step 503, the memory page header can be examined to determine the number of keys on the page. This value is desirably saved in a variable (e.g., "max"). A counting variable (e.g., "count") may also be created to keep track of the current key being examined. The value of count is set to zero.

At step 504, the value of count is compared to max to determine if all of the keys have been examined. If count is greater than or equal to max, the page may have been compressed and the routine exits at step 599. If count is less than max, there may be more keys to examine, and processing continues at step 505.

At step 505, the slot at position count in the slot array is examined. This slot desirably corresponds to the key at position count. Contained in the slot is the memory offset where the key begins, and a variable or flag indicating if the key is compressed. The slot array can begin at the end of the memory page and grows backward towards the header, and each slot may be a fixed size. The slot at position count is preferably located by looking at the memory offset equal to the size of the page minus the size of the slot multiplied by count.

If the slot at position count indicates that the key is compressed or the key is the first key in the page, then processing can move to step 515 where count is incremented by 1. If the slot at position count indicates that the key is uncompressed, then processing continues at step 509, where the key at position count is compressed. The key can be compressed by comparing the key at position count to the previous key and finding the common prefix length.

It may be appreciated that because the previous key can itself be compressed, some or all previous keys are examined to determine the correct common prefix. A copy of the previous uncompressed key can be stored ("key_copy") to allow for faster compression of the current key and avoid looking at some or all of the other previous keys. The current key can then be quickly compressed by comparing it with the copy of the uncompressed previous key. After compressing the current key, the value of key_copy is updated with the uncompressed value of the current key. The slot corresponding to the current key is updated to reflect that the current key is now compressed.

At step 511, the keys on the memory page are shifted to fill the empty space that may have resulted from the compression of the key. Each key following the current key is shifted by an amount equal to the difference between the current key and the key_copy which contains the copy of the uncompressed current key. In addition, each slot following the current key is updated to reflect the new memory offsets for their respective keys.

At step 515, the value of count is increased by 1 and processing returns to step 504 where the next key on the memory page can be compressed.

At step 599, the embodiment may exit.

Exemplary Computing Environment

Figure 6:
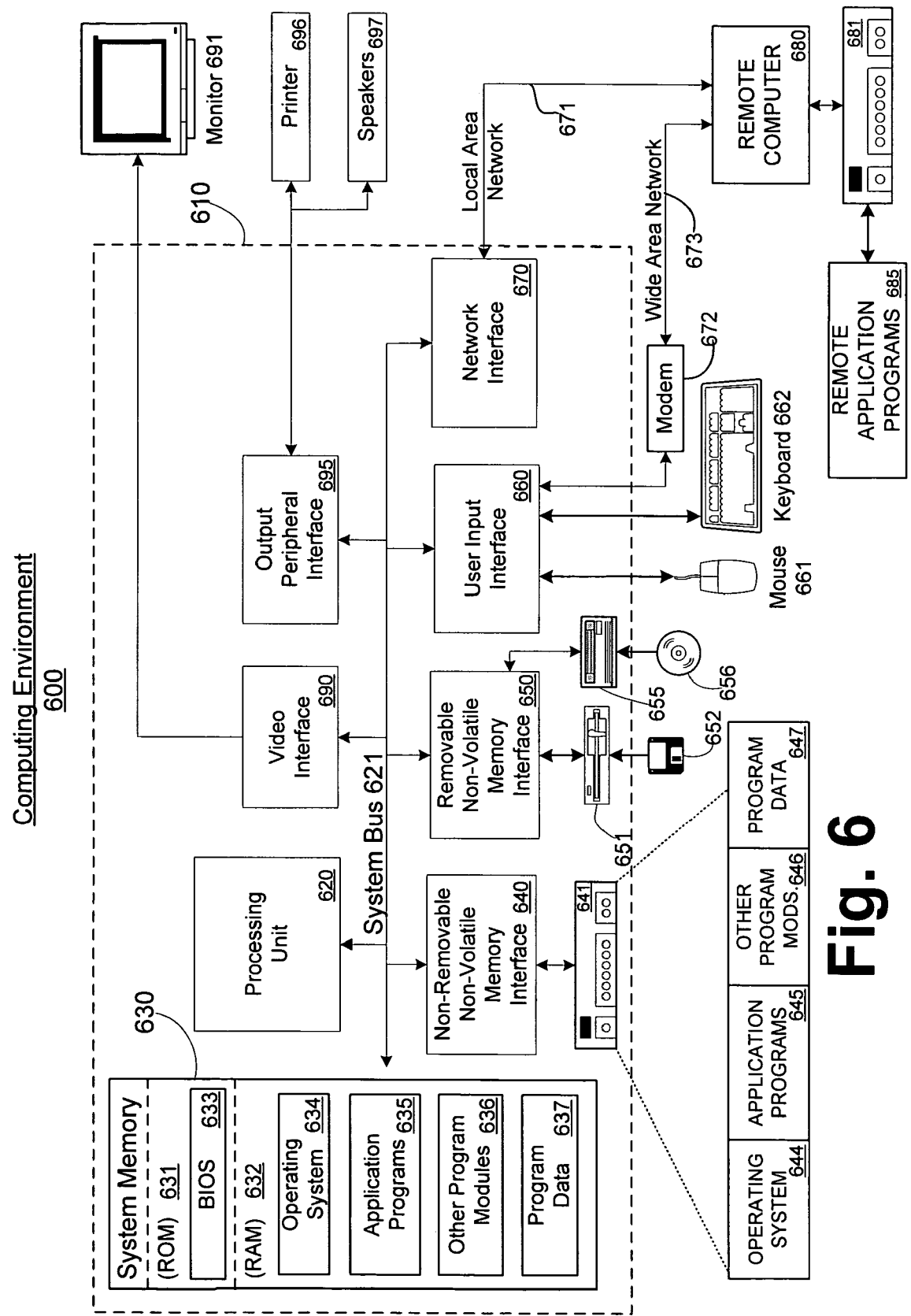
FIG. 6 is a block diagram showing an exemplary computing environment in which aspects of the invention may be implemented.

FIG. 6 illustrates an example of a suitable computing system environment 600 in which the invention may be implemented. The computing system environment 600 is only one example of a suitable computing environment and is not intended to suggest any limitation as to the scope of use or functionality of the invention. Neither should the computing environment 600 be interpreted as having any dependency or requirement relating to any one or combination of components illustrated in the exemplary operating environment 600.

The invention is operational with numerous other general purpose or special purpose computing system environments or configurations, such as for example, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

With reference to FIG. 6, an exemplary system for implementing the invention includes a general purpose computing device in the form of a computer 610. Components of computer 610 may include, but are not limited to, a processing unit 620, a system memory 630, and a system bus 621 that couples various system components including the system memory to the processing unit 620. The system bus 621 may be any of several types of bus structures including a memory bus or memory controller, a peripheral bus, and a local bus using any of a variety of bus architectures.

Computer 610 typically includes a variety of computer readable media, and includes both volatile and non-volatile media, removable and non-removable media.

The system memory 630 includes computer storage media in the form of volatile and/or non-volatile memory such as ROM 631 and RAM 632. A basic input/output system 633 (BIOS), containing the basic routines that help to transfer information between elements within computer 610, such as during start-up, is typically stored in ROM 631. By way of example, and not limitation, FIG. 6 illustrates operating system 634, application programs 635, other program modules 636, and program data 637.

The computer 610 may also include other removable/non-removable, volatile/non-volatile computer storage media. By way of example only, FIG. 6 illustrates a hard disk drive 641 that reads from or writes to non-removable, non-volatile magnetic media, a magnetic disk drive 651 that reads from or writes to a removable, non-volatile magnetic disk 652, and an optical disk drive 655 that reads from or writes to a removable, non-volatile optical disk 656. The hard disk drive 641 is typically connected to the system bus 621 through a non-removable memory interface such as interface 640, and magnetic disk drive 651 and optical disk drive 655 are typically connected to the system bus 621 by a removable memory interface, such as interface 650.

The drives and their associated computer storage media provide storage of computer readable instructions, data structures, program modules and other data for the computer 610. In FIG. 6, for example, hard disk drive 641 is illustrated as storing operating system 644, application programs 645, other program modules 646, and program data 647. Note that these components can either be the same as or different from operating system 644, application programs 645, other program modules 646, and program data 647. A user may enter commands and information into the computer 610 through input devices such as a keyboard 662 and pointing device 661, commonly referred to as a mouse, trackball or touch pad. These and other input devices are often connected to the processing unit 620 through a user input interface 660 that is coupled to the system bus, but may be connected by other interface and bus structures. A monitor 691 or other type of display device is also connected to the system bus 621 via an interface, such as a video interface 690. In addition to the monitor, computers may also include other peripheral output devices such as speakers 697 and printer 696, which may be connected through an output peripheral interface 695.

The computer 610 may operate in a networked environment using logical connections to one or more remote computers, such as a remote computer 680. The remote computer 680 may be a personal computer, a server, a router, a network PC, a peer device or other common network node, and typically includes many or all of the elements described above relative to the computer 610, although only a memory storage device 681 has been illustrated in FIG. 6. The logical connections depicted include a LAN 671 and a WAN 673, but may also include other networks.

When used in a LAN networking environment, the computer 610 is connected to the LAN 671 through a network interface or adapter 670. When used in a WAN networking environment, the computer 610 typically includes a modem 672 or other means for establishing communications over the WAN 673, such as the internet. The modem 672, which may be internal or external, may be connected to the system bus 621 via the user input interface 660, or other appropriate mechanism. In a networked environment, program modules depicted relative to the computer 610, or portions thereof, may be stored in the remote memory storage device. By way of example, and not limitation, FIG. 6 illustrates remote application programs 685 as residing on memory device 681. It will be appreciated that the network connections shown are exemplary and other means of establishing a communications link between the computers may be used.

As mentioned above, while exemplary embodiments of the present invention have been described in connection with various computing devices, the underlying concepts may be applied to any computing device or system.

The various techniques described herein may be implemented in connection with hardware or software or, where appropriate, with a combination of both. Thus, the methods and apparatus of the present invention, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. In the case of program code execution on programmable computers, the computing device will generally include a processor, a storage medium readable by the processor (including volatile and non-volatile memory and/or storage elements), at least one input device, and at least one output device. The program(s) can be implemented in assembly or machine language, if desired. In any case, the language may be a compiled or interpreted language, and combined with hardware implementations.

The methods and apparatus of the present invention may also be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, or the like, the machine becomes an apparatus for practicing the invention. When implemented on a general-purpose processor, the program code combines with the processor to provide a unique apparatus that operates to invoke the functionality of the present invention. Additionally, any storage techniques used in connection with the present invention may invariably be a combination of hardware and software.

While the present invention has been described in connection with the preferred embodiments of the various figures, it is to be understood that other similar embodiments may be used or modifications and additions may be made to the described embodiments for performing the same function of the present invention without deviating therefrom. Therefore, the present invention should not be limited to any single embodiment, but rather should be construed in breadth and scope in accordance with the appended claims.

What is claimed:

1. A system for compression, the system comprising:

a memory device that stores a b-tree data structure comprising a plurality of compressed and uncompressed normalized index keys, each normalized index key generated by normalizing a plurality of column values that constitute an index key, the normalized index keys stored in sorted order, with no gaps between the stored normalized index keys, and stores a plurality of slots with no gaps between the stored slots, wherein the memory device stores the plurality of compressed and uncompressed normalized index keys starting after a header and the plurality of normalized index keys grows towards an end of the memory device as additional index keys are added; and, a processor that compresses the stored normalized keys on a memory page by:
(a) determining if a first normalized index key in the memory device should be compressed;
(b) comparing the first normalized index key with a second normalized index key preceding the first normalized index key in the memory device;
(c) generating a common byte length between the first normalized index key and the second normalized index key consisting of a number of bytes in a common prefix between the first normalized index key and the second normalized index key;
(d) replacing the first normalized index key in the memory page with the generated common byte length followed by the bytes from the first normalized index key that were not in the common prefix between the first normalized index key and the second normalized index key;
(e) shifting the normalized index keys following the first normalized index key to fill any empty memory space resulting from compressing the first normalized index key and updating memory offsets contained in the slots corresponding to the shifted normalized index keys; and
(f) updating an indicator in the slot corresponding to the first normalized index key to reflect that the key is now compressed, wherein each slot corresponds to a normalized index key in the memory page and comprises a memory offset of the corresponding key and an indicator indicating if the corresponding normalized index key is compressed, wherein the processor compresses the stored normalized index keys before a memory page split.

2. The system of claim 1, wherein the memory device stores the plurality of compressed and uncompressed normalized index keys starting after the header and the plurality of normalized index keys grows towards the end of the memory device as additional index keys are added.

3. The system of claim 1, further comprising the processor repeating steps (a)-(f) for each normalized index key in the memory device.

4. The system of claim 1, wherein the processor determining if a first normalized index key should be compressed comprises:

examining the indicator in the slot corresponding to the first normalized index key to determine if the first normalized key is already compressed and not compressing a key that has already been compressed; and determining if the first normalized index key has a preceding index key on the memory device and not compressing a key that does not have a preceding index key on the memory device.

5. A method for compressing a b-tree data structure, the method comprising the following steps:

storing a plurality of compressed and uncompressed normalized index keys of the b-tree data structure in sorted order in a memory page with no gaps between the stored normalized keys, wherein each index key comprises a plurality of columns each having a column value and a column type and is normalized by normalizing each column value using a normalization function selected based on the column type and concatenating the normalized column values;

storing a plurality of slots with no gaps between the stored slots;

storing a header;

compressing by a computer processor the stored normalized index keys on the memory page by
(a) determining if a first normalized index key in the memory page should be compressed;
(b) comparing the first normalized index key with a second normalized index key preceding the first normalized index key in the memory page;
(c) generating a common byte length between the first normalized index key and the second normalized index key comprising a number of bytes in a common prefix between the first normalized index key and the second normalized index key;
(d) replacing the first normalized index key in the memory page with the generated common byte length followed by the bytes from the first normalized index key that were not in the common prefix between the first normalized index key and the second normalized index key;
(e) shifting the normalized index keys following the first normalized index key to fill any empty memory space resulting from compressing the first normalized index key and updating the memory offsets contained in the slots corresponding to the shifted normalized index keys; and
(f) updating an indicator in the slot corresponding to the first normalized index key to reflect that the key is now compressed; and after compressing each stored normalized index key, shifting at least one other stored normalized index key to fill an empty memory space resulting from compressing the stored normalized index key, wherein storing the plurality of slots comprises starting immediately at an end of the memory page and growing towards a beginning of the memory page as additional slots are added, further wherein each slot corresponds to a normalized index key in the memory page and comprises a memory offset of the corresponding key and an indicator indicating if the corresponding normalized index key is compressed, wherein compressing the stored normalized index keys is performed before a memory page split.

6. The method of claim 5, wherein storing the plurality of compressed and uncompressed normalized index keys comprises starting following the header with the plurality of normalized index keys growing towards the end of the memory page as additional index keys are added.

7. The method of claim 5, further comprising repeating steps (a)-(f) for each normalized index key in the memory page.

8. The method of claim 5, wherein the determining if a first normalized index key should be compressed comprises:

examining the indicator in the slot corresponding to the first normalized index key to determine if the first normalized key is already compressed and not compressing a key that has already been compressed; and determining if the first normalized index key has a preceding index key on the memory page and not compressing a key that does not have a preceding index key on the memory page.

9. A method for compressing normalized index keys in a b-tree data structure, the method comprising the following steps:

(a) determining by a computer processor if a first normalized index key in a memory page of the b-tree data structure should be compressed, wherein the first normalized index key is generated by normalizing a plurality of first column values that constitute a first index key and concatenating the normalized first column values, wherein determining if a first normalized index key should be compressed comprises:

examining an indicator in the slot corresponding to the first normalized index key to determine if the first normalized key is already compressed and not compressing a key that has already been compressed; and determining if the first normalized index key has a preceding index key on the memory page and not compressing a key that does not have a preceding index key on the memory page;

(b) comparing by a computer processor the first normalized index key with a second normalized index key preceding the first normalized index key in the memory page, wherein the second normalized index key is generated by normalizing a plurality of second column values that constitute a second index key and concatenating the normalized second column values;

(c) generating by a computer processor a common byte length between the first normalized index key and the second normalized index key comprising a number of bytes in a common prefix between the first normalized index key and the second normalized index key;

(d) replacing by a computer processor the first normalized index key in the memory page with the generated common byte length followed by the bytes from the first normalized index key that were not in the common prefix between the first normalized index key and the second normalized index key;

(e) shifting by a computer processor the normalized index keys following the first normalized index key to fill any empty memory space resulting from compressing the first normalized index key and updating memory offsets contained in the slots corresponding to the shifted normalized index keys; and (f) updating by a computer processor the indicator in the slot corresponding to the first normalized index key to reflect that the key is now compressed.

10. The method of claim 9, further comprising repeating steps (a)-(f) for each normalized index key in the memory page.

* * * * *